US008936410B2

(12) United States Patent
Genter et al.

(10) Patent No.: US 8,936,410 B2
(45) Date of Patent: Jan. 20, 2015

(54) REMOTE HOPPER RELEASE

(75) Inventors: Michael David Genter, Clarkston, MI (US); Cecil I. Hand, Clarkston, MI (US); Barry A. Clark, Ortonville, MI (US)

(73) Assignee: Roura Material Handling, Inc., Clinton Township, MI (US)

( * ) Notice: Subject to any disclaimer, the term of this patent is extended or adjusted under 35 U.S.C. 154(b) by 941 days.

(21) Appl. No.: 12/915,798

(22) Filed: Oct. 29, 2010

(65) Prior Publication Data

US 2012/0107040 A1 May 3, 2012

(51) Int. Cl.
*F16B 21/00* (2006.01)
*B66F 9/19* (2006.01)

(52) U.S. Cl.
CPC .......................................... *B66F 9/19* (2013.01)
USPC ...................... 403/322.3; 403/322.4; 403/330

(58) Field of Classification Search
CPC .......... B65G 65/30; F16B 21/00; F16B 21/02
USPC ............................ 403/322.3, 322.4, 325, 330
See application file for complete search history.

(56) References Cited

U.S. PATENT DOCUMENTS

| | | | | | |
|---|---|---|---|---|---|
| 2,305,241 | A * | 12/1942 | Duncan | 105/286 |
| 3,159,225 | A * | 12/1964 | Zimmerman | 177/107 |
| 3,486,648 | A * | 12/1969 | Dewald | 414/420 |
| 3,881,617 | A * | 5/1975 | Miller et al. | 414/422 |
| 4,955,754 | A * | 9/1990 | Smith | 404/108 |
| 5,310,302 | A * | 5/1994 | Ferguson, Sr. | 414/420 |
| 5,853,277 | A * | 12/1998 | Everhart | 414/408 |
| 5,951,230 | A * | 9/1999 | Kruzick et al. | 414/420 |
| 6,715,980 | B2 * | 4/2004 | Bouthillier | 414/642 |
| 6,733,225 | B1 * | 5/2004 | Barnett et al. | 414/420 |
| 7,350,873 | B2 * | 4/2008 | Bibeau | 298/23 M |
| 7,731,297 | B1 * | 6/2010 | Ozanich | 298/7 |
| 8,182,046 | B1 * | 5/2012 | Hauth et al. | 298/29 |
| 2004/0076497 | A1 * | 4/2004 | Barnett et al. | 414/424 |
| 2007/0085365 | A1 * | 4/2007 | Bibeau | 296/50 |
| 2007/0296257 | A1 * | 12/2007 | Nathan et al. | 297/325 |
| 2011/0064550 | A1 * | 3/2011 | Genter et al. | 414/425 |
| 2012/0212032 | A1 * | 8/2012 | Hauth et al. | 298/38 |

* cited by examiner

*Primary Examiner* — Victor MacArthur
(74) *Attorney, Agent, or Firm* — Cantor Colburn LLP

(57) ABSTRACT

A dump body latching system for application to a self dumping hopper comprises a battery, a linear actuator assembly having an actuator rod configured for reciprocal motion into and out of a housing, an actuator cable having a first end attached to the actuator rod and a second end attached to a biased trip lever and a controller configured to connect the battery with the linear actuator to withdraw the actuator rod into the housing and thereby pull the actuator cable and the biased trip lever to disengage the trip lever from a locking pin.

15 Claims, 7 Drawing Sheets

REMOTE HOPPER RELEASE

FIELD OF THE INVENTION

The invention relates to the field of portable containers for the transportation of materials and, more specifically, to a self dumping hopper having a system for remote, self dumping actuation thereof.

BACKGROUND

The statements in this section merely provide background information related to the present disclosure and may, or may not constitute prior art.

Containers or hoppers are typically used in manufacturing operations to facilitate the movement of various materials. Self dumping hoppers are one genre of container that are frequently used to collect scrap material (such as from machining operations, for instance). Self dumping hoppers may include specialized configurations that allow for relatively simple handling and movement by a fork truck, and ease of emptying as well.

A base platform may be provided that includes spaced slots, or an opening that is configured to engage the tines of a fork truck for lifting, moving and placement purposes. Mounted on the base platform is a dump body that is adapted to rest upright during filling of the hopper but that includes a geometry that, especially when filled, is biased to allow the hopper to be easily tilted towards an emptying position. A latching mechanism associated with the base platform is operable to engage a locking pin extending from the dump body to maintain it in its upright, fill position. Latching mechanisms commonly in use employ a spring biased handle that may be actuated (often by the fork truck operator), once the self dumping hopper or material handling container has been moved into position for emptying. Activating the latching mechanism allows the dump body to rotate or hinge open from a side or bottom into a second, emptying position. Such devices typically require that the fork truck operator disembark from the fork truck and its protective surroundings to manually activate the latching mechanism handle to initiate the emptying process.

Latching mechanisms that are remotely controlled have been introduced. Such devices often include hydraulic actuators that require a fluid connection to the hydraulic system of the fork truck, if available. These devices are costly and typically require an interface with the fork truck that may either be unavailable, require retrofitting of the fork truck, or the purchase by the customer of specific fork trucks. In addition, hydraulic devices that are associated with the hydraulic system of the fork truck require a connect/disconnect operation by the operator each time that a hopper is moved, resulting in time loss and reduced efficiency. Other, less costly devices have included pull cords and pulley systems that are mounted to the fork truck, the fork truck upright, the fork carriage assembly or a combination thereof. Such devices also require integration of the release system with the fork truck which may be undesirable, require retrofitting of the fork truck, or the purchase by the customer of specific fork trucks.

SUMMARY

In an exemplary embodiment a dump body latching system for application to a self dumping hopper having a base platform, a rotatable dump body mounted thereto and a latching mechanism having a biased trip lever engageable with a locking pin on the rotatable dump body and configured to control the rotation of the rotatable dump body thereon is disclosed. The dump body latching system comprises a battery, a linear actuator assembly having an actuator rod configured for reciprocal motion into and out of a housing, an actuator cable having a first end attached to the actuator rod and a second end attached to the biased trip lever and a controller configured to connect the battery with the linear actuator to withdraw the actuator rod into the housing and thereby pull the actuator cable and the biased trip lever to disengage the trip lever from the locking pin.

The above features and advantages, and other features and advantages of the present invention are readily apparent from the following detailed description of the invention when taken in conjunction with the accompanying drawings.

BRIEF DESCRIPTION OF THE DRAWINGS

Other objects, features, advantages and details appear, by way of example only, in the following detailed description of embodiments, the detailed description referring to the drawings in which.

BRIEF DESCRIPTION OF THE EMBODIMENTS

Figure 1A:
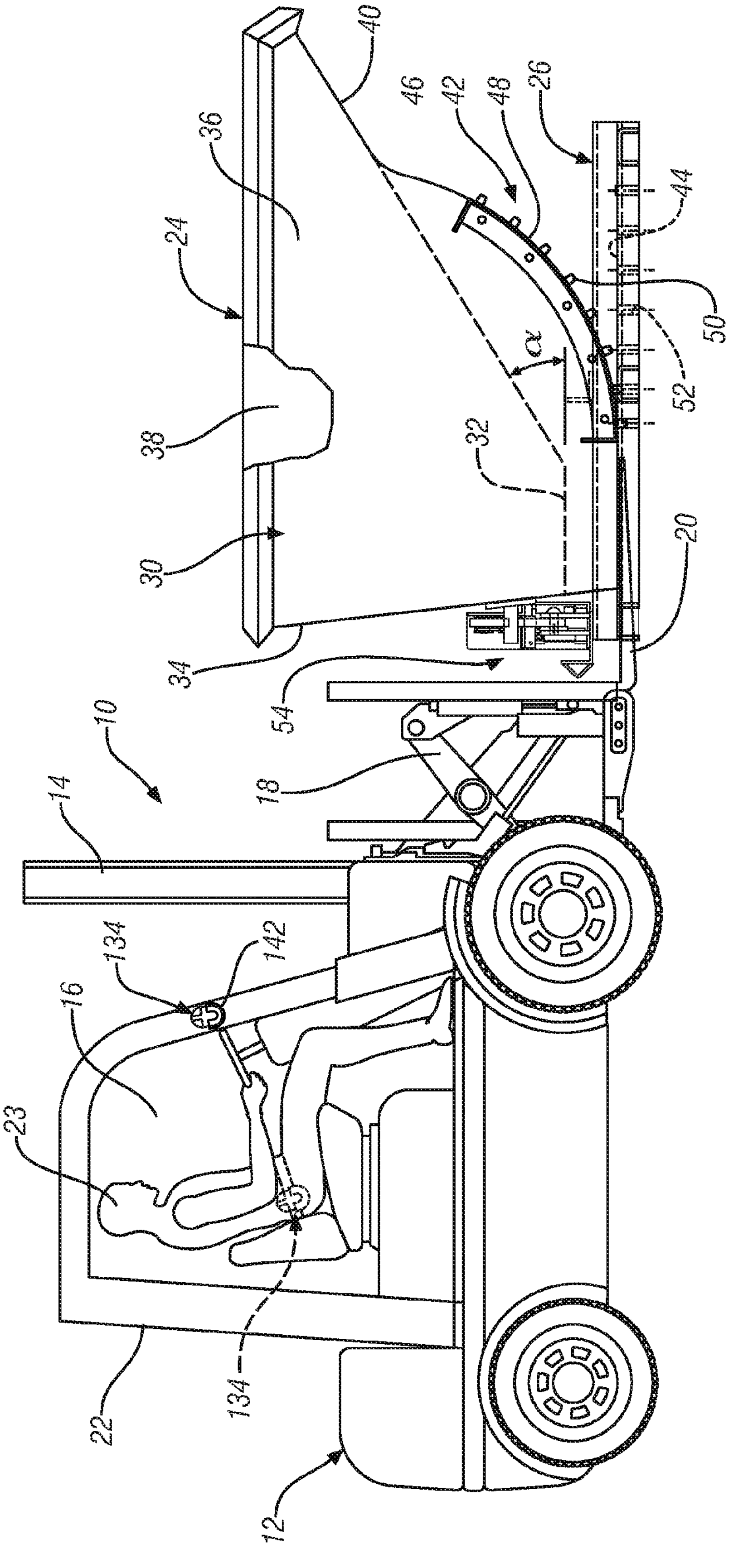
FIG. 1A is a perspective view of a fork truck, and a self dumping hopper illustrated in a upright and locked mode, and embodying features of the invention.

The following description is merely exemplary in nature and is not intended to limit the present disclosure, application or uses. It should be understood that throughout the drawings, corresponding reference numerals indicate like or corresponding parts and features.

Figure 1B:
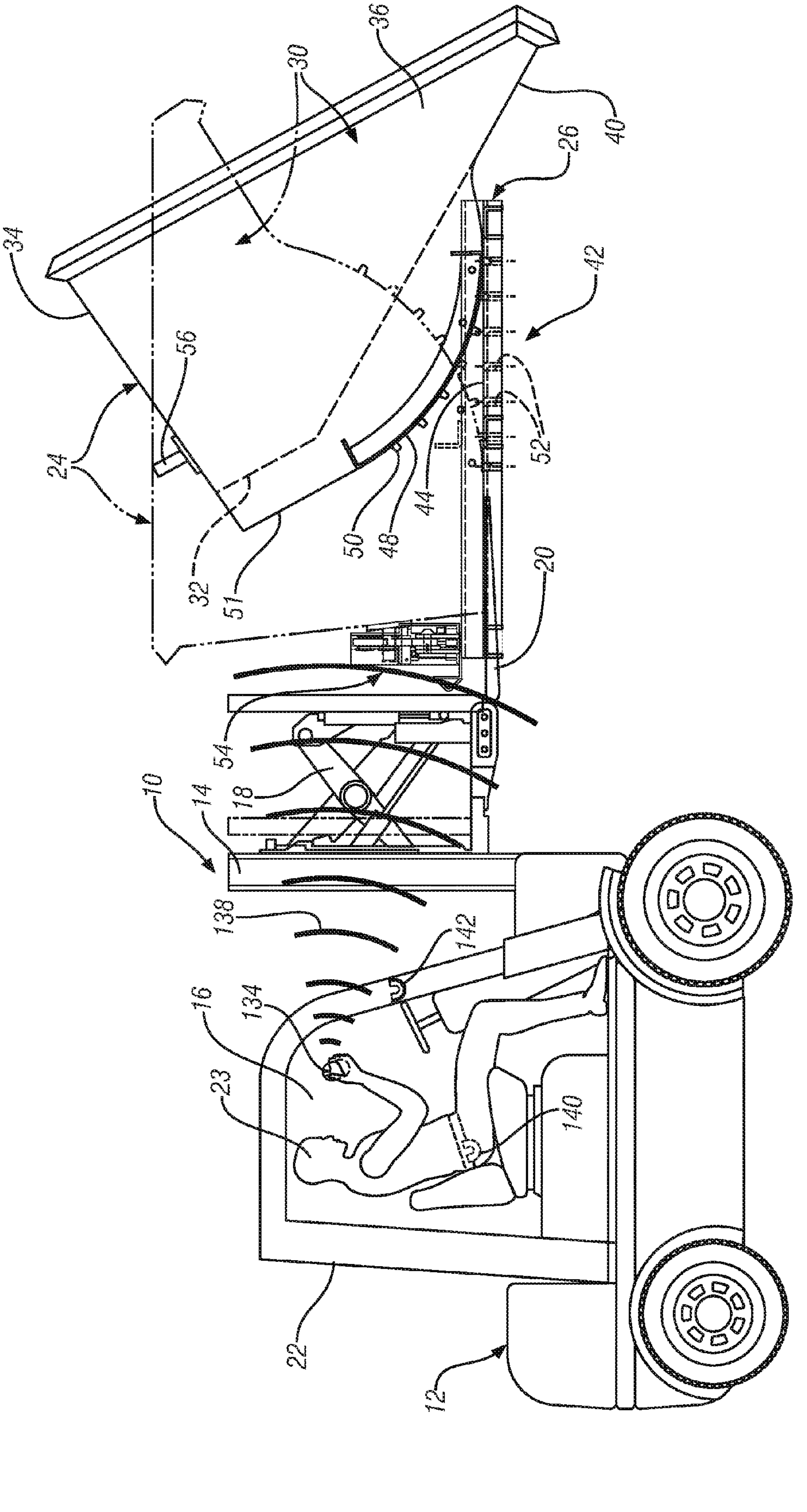
FIG. 1B is a perspective view of a fork truck, and a self dumping hopper illustrated in a dumping mode, and embodying features of the invention.

In accordance with an exemplary embodiment, FIGS. 1A and 1B schematically illustrate a fork truck 10 having a wheel supported body section 12, an upright 14, an operators compartment 16, outrigger arms 18 extending forwardly of the body section 12, and a pair of fork tines 20 associated with the outrigger arms 18 for engaging a variety of cargo that is moveable and placeable by the fork truck. The fork truck 10 may include a safety cage 22 that extends about and defines the operator's compartment 16. The safety cage 22 is intended to protect the operator 23 should cargo being moved/placed by the fork truck 10 become unstable and fall. It should be apparent that, during operation of the fork truck 10, the operator is in a preferred location when he or she remains in the operators compartment 16 surrounded by the safety cage 22.

Figure 2:
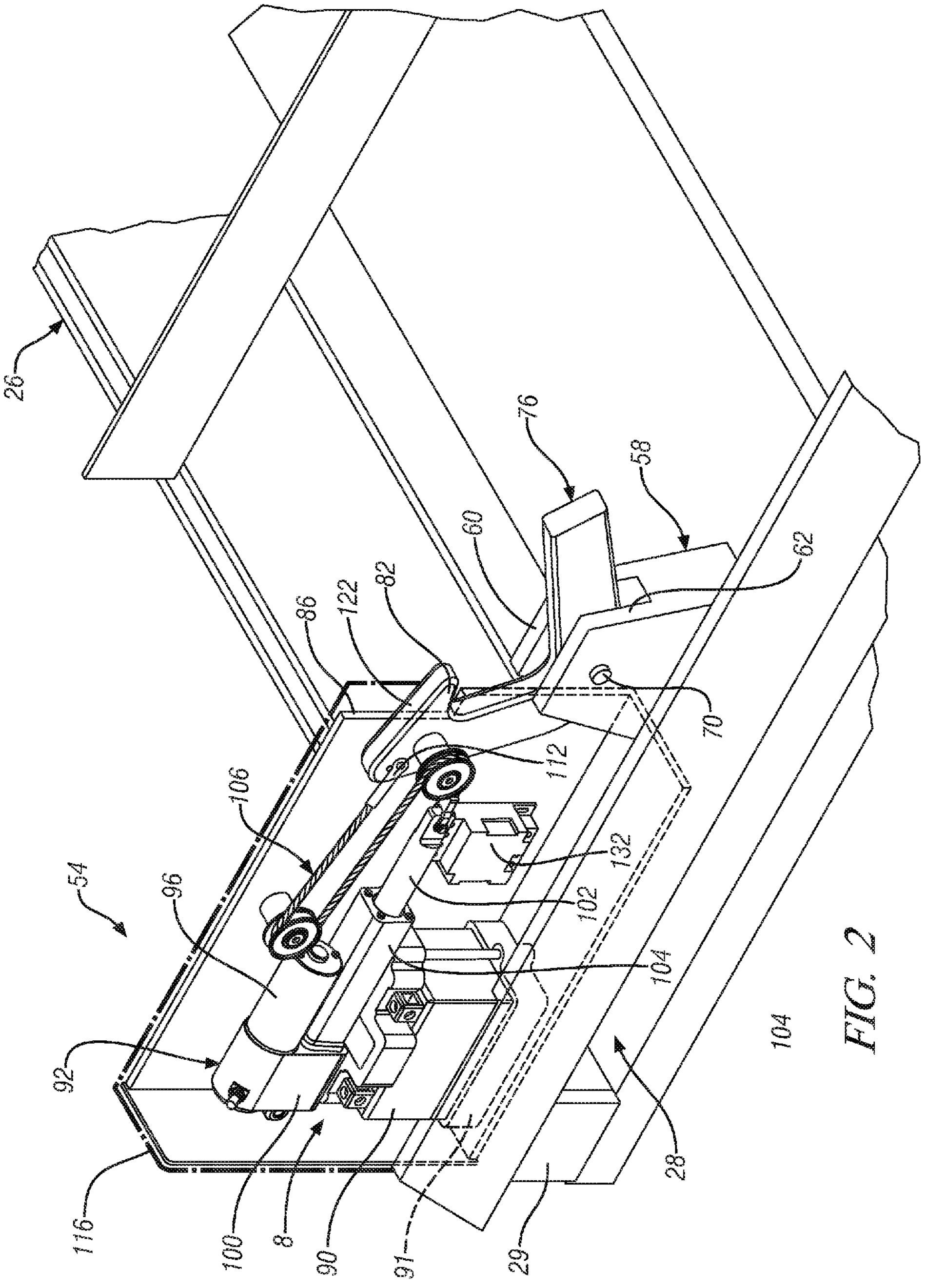
FIG. 2 is a perspective view of a dump body latching system with covers removed to illustrate features of the invention.

Referring to FIGS. 1A, 1B and 2, a self dumping hopper (hopper) 24 is provided. The hopper 24 includes a base platform 26 that includes a lift opening or openings 28 that are configured to accept the fork tines 20 of the fork truck 10 for the purpose of lifting, moving and positioning the self dumping hopper 24 by the fork truck 10. The opening(s) 28 may be defined by supports 29 that extend below and support the base platform 26. Mounted on the base platform 26 is a dump body 30 that includes a planar bottom portion 32 adapted to rest in a generally parallel relationship to the base platform 26 when the dump body 30 is retained in a first, upright position, FIG. 1A, for filling or storing of material. Back and side panels 34 and 36, respectively, extend upwardly from the bottom portion 32 to partially define an interior container portion 38 of the dump body 30. A front panel 40 completes the interior container portion 38 and extends from the horizontal bottom portion 32 outwardly (i.e. towards the front of the hopper 24) at an angle ("$\alpha$") such that the surface area of the front panel 40 is greater than that of the bottom portion 32 to thereby define a dump body geometry that, especially when filled, is biased to allow the hopper to be easily tilted forward, towards a second, emptying position, shown in FIG. 1B.

In an exemplary embodiment, a tracked pivoting system, referred to generally as 42, is incorporated into the base platform 26 and the dump body 30 and is configured to provide for controlled emptying of the dump body 30 of the self dumping hopper 24. The tracked pivoting system 42 includes trunion tracks 44 that extend longitudinally from front to back along the outer edges of the base platform 26. Rocker plates 46 extend downwardly from the outer edges of side panels 36 to terminate in curved edge surfaces 48 that are configured to engage, and roll along, the trunion tracks 44 allowing the dump body 30 to be rotated in a forward (and backward) direction. The curved edge surfaces 48 terminate in rearward extending flat portions 51 that will maintain the dump body 30 in the first, upright position for filling or storing of material. Spaced trunion pins 50 extend outwardly from the curved edge surfaces 48 of the rocker plates 46 and are configured to engage a series of spaced openings 52 in the trunion tracks 44 during rotation of the dump body 30. The engagement of the trunion pins 50 with the spaced trunion openings 52 in the trunion tracks 44 operate to confine the dump body 30 against lateral shifting movement as it is tilted. Suitable stops (not shown) will limit the forward rotating movement of the dump body 30.

In an exemplary embodiment illustrated in FIGS. 2 and 3A-C, a dump body latching system, referred to generally as 54 is associated with the base platform 26 and is configured to engage a locking pin 56 that extends from the back panel 34 of the dump body 30. It is also contemplated that the locking pin 56, or additional locking pins 56, may extend from a side panel 36, and include a latching mechanism closely associated therewith, without deviating from the scope of the invention. In an exemplary embodiment, the dump body latching system 54 may be configured to include a double bracket 58 that is welded or otherwise fixed to the base platform 26 and extends upwardly therefrom. The double bracket 58 includes spaced bracket portions 60 and 62 that each include openings that share a common axis for receipt of a pivot pin 70 therein. The pivot pin 70 is configured to receive, and anchor, a first end 71 of a concentric coil spring 72. A second end 74 of the concentric coil spring is secured at securing point 78, to a first, lower end 77 of a trip lever 76 that is pivotally mounted on the pivot pin 70, adjacent to the concentric coil spring 72 and between the spaced bracket portions 60, 62. The trip lever has an upwardly extending arm portion 80 that includes a hook portion 82 located at a second end 84 thereof. The hook portion 82 is adapted to extend over the locking pin 56 on the dump body 30 to maintain the dump body 30 securely in its first, fixed or fill position (i.e. for receiving or storing material). The concentric coil spring 72 is preloaded such that it urges the hook portion 82 of the trip lever 76 into engagement with the locking pin 56, as a default. It should be appreciated that the embodiment described discloses the use of a concentric coil spring for biasing the trip lever 76 into a latched position with respect to the locking pin 56 of the dump body 30. However, it is contemplated that other suitable biasing mechanisms such as extension springs, spring loaded struts, torsion springs and the like may be used as well.

In order to release the trip lever 76, to thereby allow for forward pivoting of the dump body 30 to a second, emptying position, FIG. 1B, the dump body latching system 54 comprises, in an exemplary embodiment, a trip lever release module 85 that is mounted to the base platform 26 using, for instance, a support bracket 86. The support bracket 86 is configured to support the various components to be herein described. An electrical power source such as battery 90 is mounted in battery box 91 within the release module 85. The battery 90 provides electrical power to an electric linear actuator assembly 92 that is mounted for pivotal rotation within the housing about mounting pin 94.

In an exemplary embodiment, the linear actuator assembly comprises an electric motor 96, a linear actuator 98 and a transfer box 100 disposed therebetween and operationally interconnecting the two. The linear actuator 98 includes an actuator cylinder or rod 102 that is slidingly disposed within a tubular housing 104. In an exemplary embodiment, when electrical power from the battery 90 is applied to the electric motor 96 the rotation of the shaft (not shown) of the electric motor is transferred to the actuator rod through a gear or belt reduction (not shown) in the transfer box 100. Rotation of a portion of the actuator cylinder or rod 102 within the housing 104 results in its extension from, or retraction into the housing 104, FIGS. 3A and 3B, in a known manner.

In an exemplary embodiment, an actuator cable 106 is attached at a first end 108 to the terminal end 110 of the actuator cylinder or rod 102. The attachment may be through the use of a cable grommet 112 or other suitable mechanism for attachment of the first end 108 of the actuator cable 106 to the actuator cylinder or rod 102. A second end 114 of the actuator cable 106 is attached to the second end 84 of the upwardly extending arm portion 80 of the trip lever 76. As described, the attachment may be through the use of a cable grommet 112 or other suitable mechanism for attachment of the second end 114 of the actuator cable 106 to the trip lever 76. Disposed at horizontally and vertically spaced positions between the first end 108 and the second end 112 of the actuator cable 106 is one or more pulleys 115 about which the actuator cable 106 is wound. The pulley or pulleys 115 provide support for the actuator cable 106 between the terminal end 110 of the actuator cylinder or rod 102 and the second end 84 of the upwardly extending arm portion 80 of the trip lever 76. The pulley(s) 115 position the second end 114 of the actuator cable in a near horizontal position relative to the second end 84 of the trip lever 76 to thereby facilitate an unlocking motion when the dump body latching system 54 is activated.

Figure 3A:
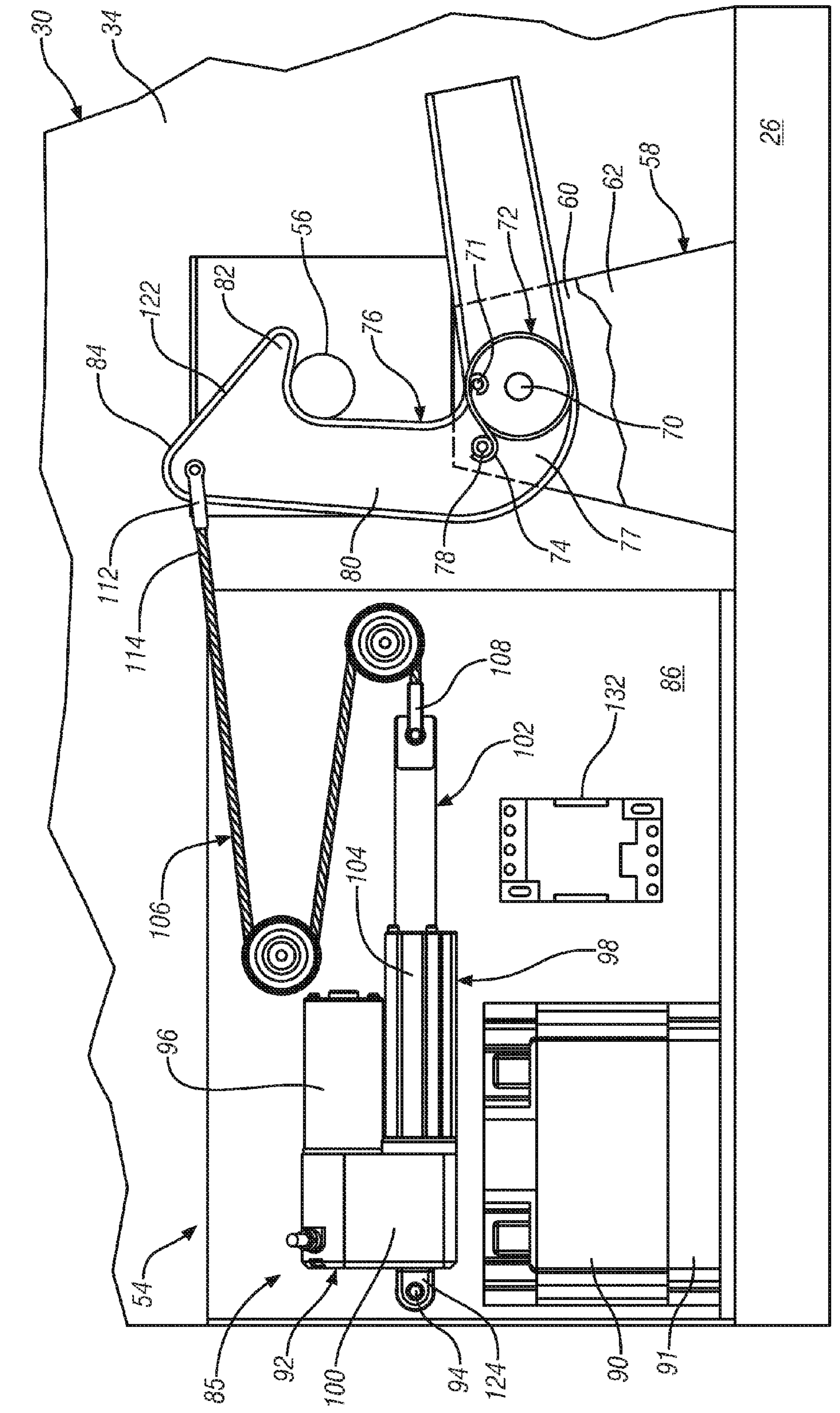
FIG. 3A is a rear view of the self dumping hopper of FIG. 1A, in a first, locked mode.

Referring to FIG. 3A, in an exemplary embodiment, during filling and storage of material in the dump body 30 of the self dumping hopper 24, as well as during movement and/or placement thereof, the actuator cylinder or rod 102 of the linear actuator 98 is in an extended position to thereby allow the actuator cable 106 sufficient length for the concentric coil spring 72 to bias the hook portion 80 of the trip lever into position over the locking pin 56.

When the fork truck 10 has positioned the self dumping hopper 24 in an appropriate position for emptying its contents, FIG. 1B, power from the battery 90 is delivered to the electric motor 96 of the linear actuator assembly 92. The cylinder rod 102 of the linear actuator assembly is withdrawn into the tubular housing of the linear actuator 98, FIG. 3B. As the cylinder rod 102 is withdrawn, the cable 106 pulls the second end 84 of the trip lever trip lever 76, and the associated hook portion 82 in a counter clockwise direction about the pivot pin 70 and against the bias of the concentric coil spring 72, to disengage the hook portion 82 from the dump body locking pin 56. Upon such disengagement, the weight biased dump body 30 will be urged by its load biased geometry to be easily tilted forward on trunion tracks 44 towards its second, emptying position.

Following disengagement of the hook portion 82 of the trip lever 76 from the locking pin 56, resulting in forward rotation of the dump body 30, the electric drive motor 96 reverses the direction of the actuator cylinder rod 102 and returns it to the extended position. When the dump body 30 of the self dumping hopper 24 is empty, the dump body is returned to its fill position FIG. 1A by rotating it rearwardly until the planar bottom portion 32 is generally horizontal and the locking pin 56 is reengaged under the hook portion 82 of the trip lever 76. In an exemplary embodiment, as the dump body 30 approaches its locked position, the locking pin will engage the ramped outer surface 122 of the locking pin 56, FIG. 3C, which has been returned to its locked position by the re-extension of the cylinder rod 102 and the biasing of the trip lever 76 by the concentric coil spring 72. The weight and downward movement of the dump body 30 will displace the trip lever 76 against the bias of the coil spring 72 enough for the locking pin 56 to clear the hook portion 82 and return to the locked position relative to the dump body latching system 54. As the trip lever 76 is rapidly displaced by the locking pin 56, the actuator cable 106 will experience a momentary slack 130 as the second end 114 is suddenly moved by the rotating trip lever 76 without a concomitant shortening of the cylinder rod 102 by the linear actuator assembly 92. In an exemplary embodiment it may be necessary to take up such cable slack 130 to avoid disengagement from the pulley(s) 115.

Figure 3B:
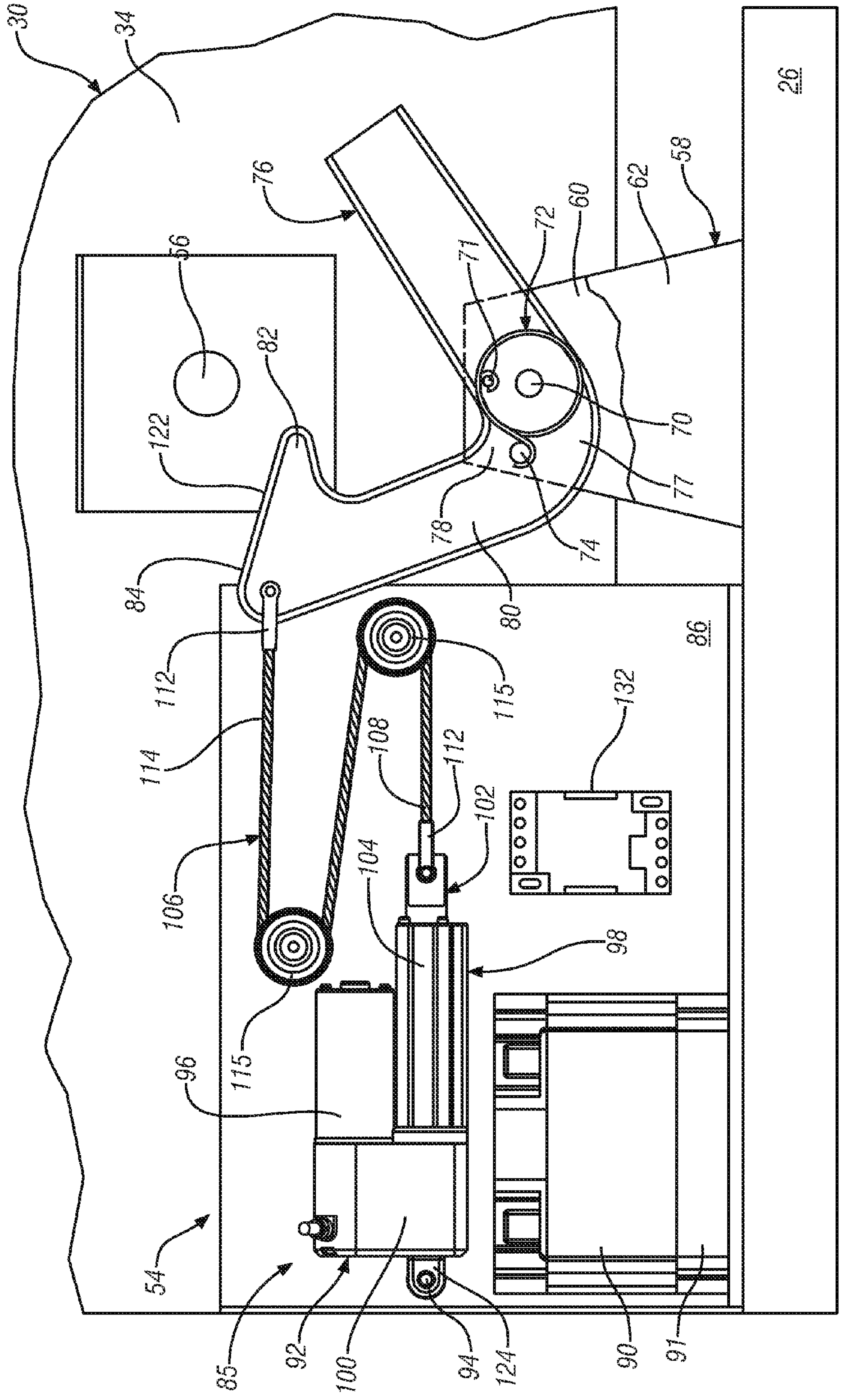
FIG. 3B is a rear view of the self dumping hopper of FIG. 1B, in a second, unlocked mode.
Figure 3C:
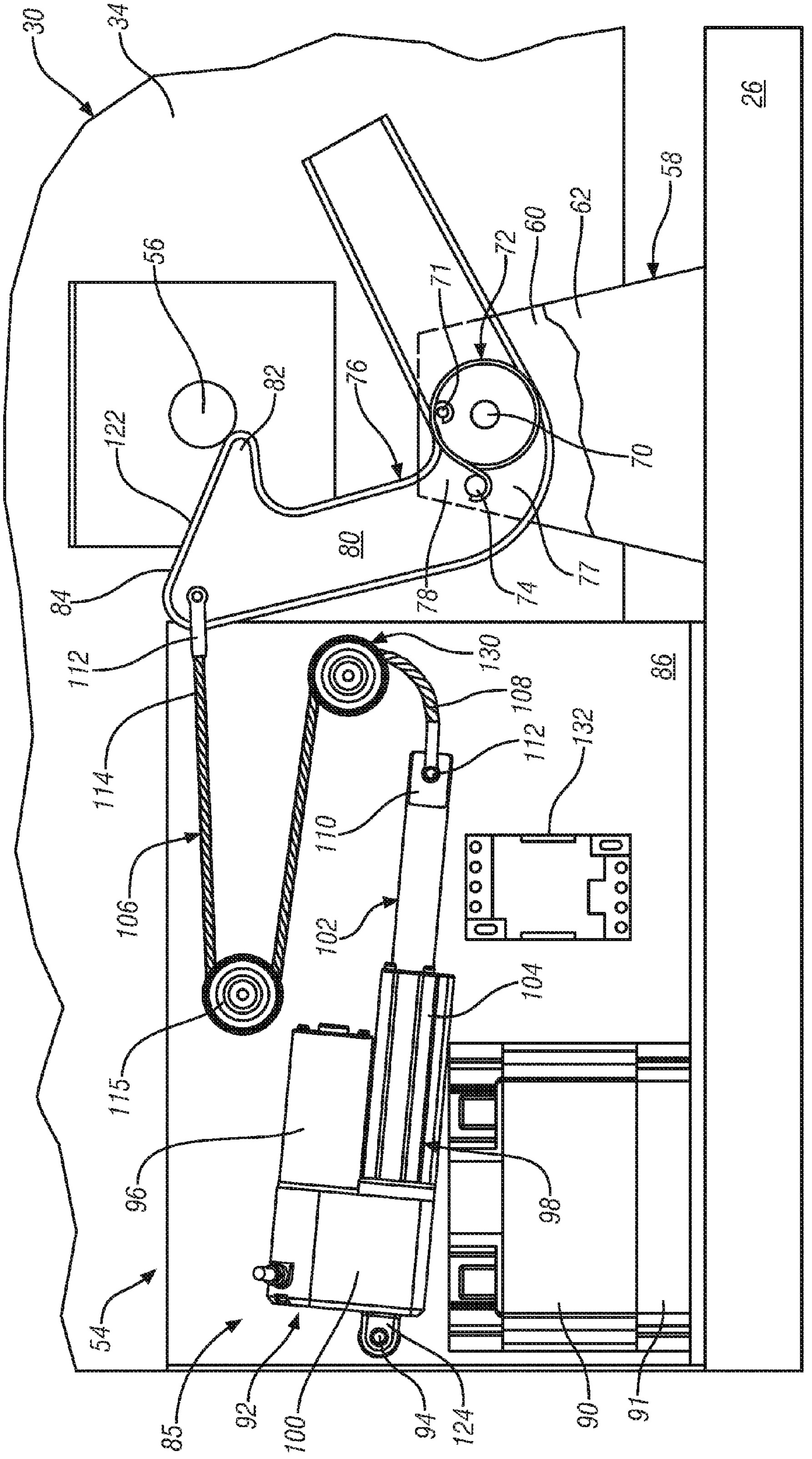
FIG. 3C is a rear view of the self dumping hopper of FIG. 1A, in a third, locking mode.

In the embodiment shown in FIGS. 3A through 3C, the linear actuator assembly 92 is pivotally mounted to the support plate 86 at pivot mount 124 that extends from the end of transfer box 100. The pivot mount 124 includes the mounting pin 94 extending therethrough, and is configured to allow the linear actuator assembly 92 to pivot thereabout, FIG. 3C, and to maintain tension in the cable 106 by taking up any momentary slack 130 that may result from the sudden movement of the trip lever 76 caused by the strike of the locking pin 56 thereagainst as the dump body 30 returns to the locked position for receiving or storing material.

The self dumping action just described may be carried out by the fork truck operator 23 from the confines of the safety cage 22 protected operator's compartment 16. An electronic receiving unit or controller 132 is mounted on the support plate 86 within the trip lever release module 85. As used herein, the term controller may refer to an application specific integrated circuit (ASIC), an electronic circuit, a processor (shared, dedicated, or group) and memory that executes one or more software or firmware programs, a combinational logic circuit, and/or other suitable components that provide the described functionality. The controller is configured to receive one or more signals from an actuator 134. The signals when received will command the electric motor 96 of the linear actuator assembly 82 to drive the actuator rod 102 inwardly or outwardly, for instance. The rod may also be self-returning using a stop switch (not shown) inside of the tubular housing 104.

The actuator 134 may be hard wired to the controller 132 or, in an exemplary embodiment and as illustrated in FIGS. 1A and 1B, may comprise a wireless transmitter 134 that may be portable and carried by the driver 23 in a manner similar to a battery powered, wireless key fob. The wireless transmitter 134 may produce a coded signal 138 that is individually selected for, and recognizable by the controller 132. Such coding is provided in order to prevent one wireless transmitter from operating more than one dump body latching system 54. The wireless transmitter 134 may be compact enough to be worn on the operator 23 in a holster-type device 140, held in a receiver 142 attached to the fork truck 10 or may include a magnetic portion configured to allow the wireless transmitter to magnetically attached to the fork truck 10 or to the self dumping hopper 24.

Figure 4:
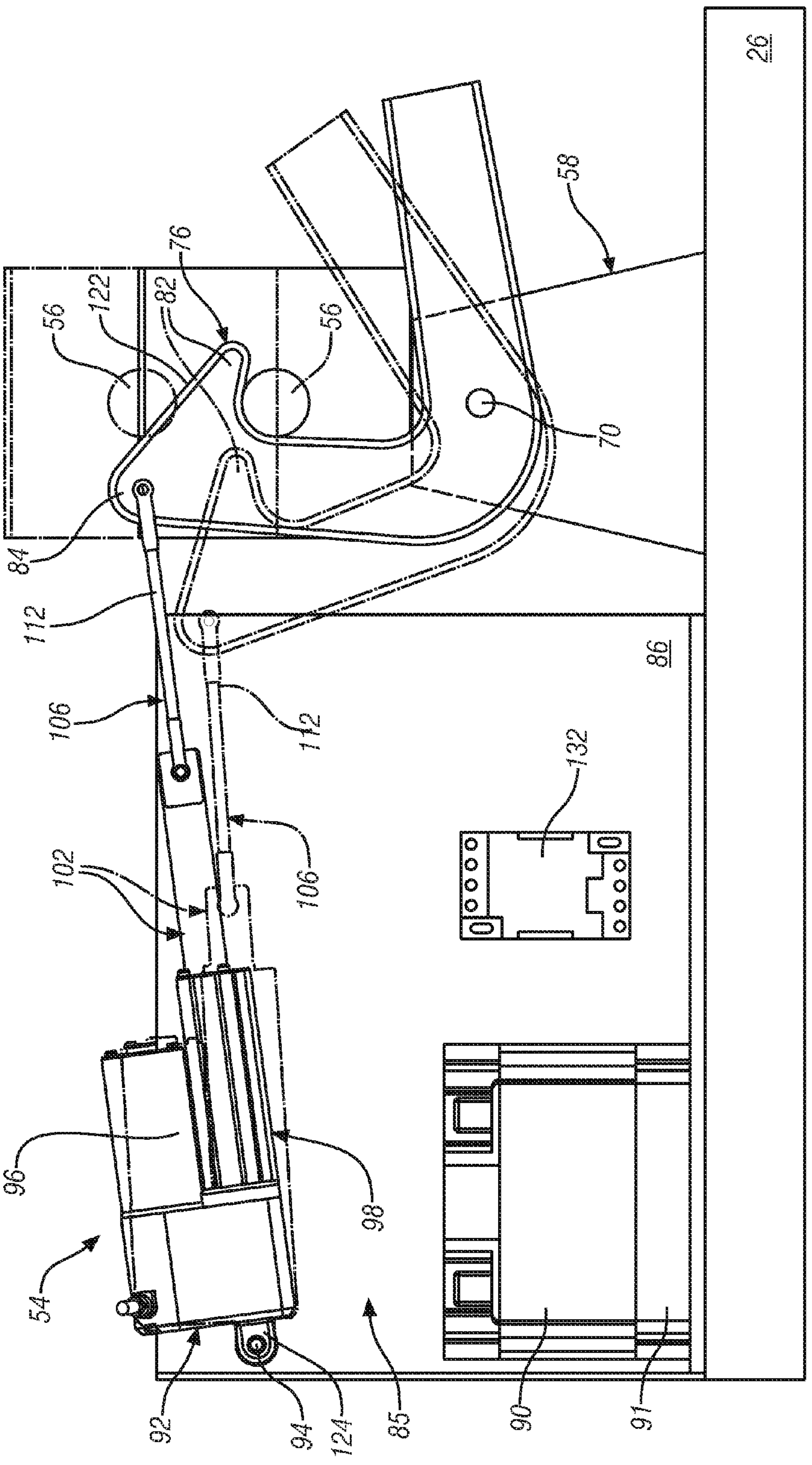
FIG. 4 is another embodiment of the dump body latching system embodying features of the invention.

Referring now to FIG. 4, in another exemplary embodiment, the linear actuator assembly 92 may be alternately mounted within the trip lever release module 85 such that the actuator cylinder or rod 102 positions the second end 112 of the actuator cable 106 in a near horizontal position relative to the second end 84 of the trip lever 76 to thereby facilitate its unlocking when the dump body latching system 54 is activated. Such a placement of the linear actuator assembly allows for a shorter actuator cable 106 and dispenses with the requirement of pulleys to properly position the cable relative to the second end of the trip lever 76.

As described above, when the fork truck 10 has positioned the self dumping hopper 24 in an appropriate location for emptying its contents, FIG. 1B, power from the battery 90 is delivered to the electric motor 96 of the linear actuator assembly 92. The cylinder rod 102 of the linear actuator assembly is withdrawn into the tubular housing 104 of the linear actuator 98. As the cylinder rod 102 is withdrawn, the cable 106 pulls the second end 84 of the trip lever trip lever 76, and the associated hook portion 82 in a counter clockwise direction about the pivot pin 70 (shown in phantom in FIG. 5), and against the bias of the concentric coil spring 72, to disengage the hook portion 82 from the dump body locking pin 56. The slight change in elevation of the second end 84 of the trip lever 76 is accommodated by a rotation of the linear actuator assembly 92 about the mounting pin 94 of its associated pivot mount 124. Upon such disengagement, the weight biased dump body 30 will be urged by its load biased geometry to be easily tilted forward on trunion tracks 44 towards its second, emptying position, shown in FIG. 1B.

Following disengagement of the hook portion 82 of the trip lever 76 from the locking pin 56, resulting in forward rotation of the dump body 30, the electric drive motor 96 reverses the direction of the actuator cylinder rod 102 and returns it to the extended position FIG. 5. When the dump body 30 of the self dumping hopper 24 is empty, the dump body is returned to its fill position, FIG. 1A, by rotating it rearwardly until the planar bottom portion 32 is generally horizontal and the locking pin 56 is reengaged under the hook portion 82 of the trip lever 76. In an exemplary embodiment, as the dump body 30 approaches its locked position, the locking pin 56 will engage the ramped outer surface 122 of the trip lever 76 which has been returned to its locked position by the re-extension of the cylinder rod 102 and the biasing of the trip lever 76 by the concentric coil spring 72. The weight and downward movement of the dump body 30 will displace the trip lever against the bias of the coil spring enough for the locking pin to clear the hook portion 82 and return to the locked position relative to the dump body latching system 54. As the trip lever 76 is rapidly displaced by the locking pin 56, the actuator cable 106 will experience a slackening as the second end 114 is suddenly moved by the rotating trip lever 76 without a concomitant shortening of the cylinder rod 102 by the linear actuator assembly 92. Such slackening will be taken up by the trip lever 76 under the bias of the concentric coil spring 72 once the pin 56 has cleared the ramp 122 and is engaged under the hook portion 82.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A dump body latching system for application to a self dumping hopper having a base platform, a rotatable dump body mounted thereto and a latching mechanism having a biased trip lever engageable with a locking pin on the rotatable dump body and configured to control the rotation of the rotatable dump body thereon, comprises:
- a battery;
- a trip lever release module configured to couple to the base platform;
- a linear actuator assembly having an actuator rod configured for reciprocal motion into and out of a housing, wherein the linear actuator assembly is pivotally mounted on the trip lever release module to allow the linear actuator assembly to pivot and to maintain tension and to take up any slack in an actuator cable;
- the actuator cable having a first end attached to the actuator rod and a second end attached to the biased trip lever; and
- a controller configured to connect the battery with the linear actuator to withdraw the actuator rod into the housing and thereby pull the actuator cable, which is configured to pull the biased trip lever, to disengage the trip lever from the locking pin.

2. The dump body latching system of claim 1, wherein the trip lever release module houses the battery, the linear actuator assembly, the actuator cable and the controller.

3. The dump body latching system of claim 2, wherein the linear actuator is mounted on the trip lever release module to position the actuator rod and the actuator cable in a near horizontal position relative to the trip lever to facilitate disengagement of the trip lever from the locking pin.

4. The dump body latching system of claim 1, further comprising at least one pulley disposed at a horizontally and vertically spaced position between the first end and the second end of the actuator cable and configured to provide support for the actuator cable between the actuator rod and the trip lever and to position the second end of the actuator cable in a near horizontal position relative to the trip lever to facilitate disengagement of the trip lever from the locking pin.

5. The dump body latching system of claim 4, wherein the at least one pulley comprises a first pulley and a second pulley disposed at a horizontally and at a vertically spaced position between the first end and the second end of the actuator cable.

6. The dump body latching system of claim 1, wherein the controller is an electronic receiving unit configured to receive one or more signals from an actuator which, when received will command the linear actuator assembly to drive the actuator rod.

7. The dump body latching system of claim 6, wherein the actuator is hard wired to the controller.

8. The dump body latching system of claim 6, wherein the actuator comprises a wireless transmitter.

9. The dump body latching system of claim 8 wherein the wireless transmitter produces a coded wireless signal that is individually selected for and recognizable by the controller.

10. The dump body latching system of claim 8, wherein the wireless transmitter is portable.

11. The dump body latching system of claim 10, wherein the wireless transmitter is configured to magnetically attach to a fork truck or to the self dumping hopper.

12. The dump body latch system of claim 1, wherein the controller includes an electronic receiving unit configured to receive one or more coded signals from a wireless transmitter for actuating the linear actuator assembly.

13. A self-dumping hopper comprising:
- a battery;
- a base platform;
- a rotatable dump body mounted to the base platform and including a locking pin on the rotatable dump body;
- a latching mechanism having a biased trip lever engageable with the locking pin, the latching mechanism configured to control the rotation of the rotatable dump body on the base platform; and
- a trip lever release module coupled to the base platform, the trip lever release module comprising:
  - a housing;
  - a linear actuator assembly mounted inside the housing, the linear actuator assembly comprising:
    - a linear actuator having an actuator rod slidingly disposed for reciprocal motion into and out of an actuator housing; and
    - an electric motor coupled to the linear actuator to slide the actuator rod within the actuator housing;
  - an actuator cable having a first end coupled to the actuator rod and a second end coupled to the trip lever, wherein the linear actuator assembly is pivotally mounted inside the trip lever release module housing to allow the linear actuator assembly to pivot and to maintain tension and take up any slack in the actuator cable; and
  - a controller comprising an electronic receiving unit mounted inside the housing, the controller configured to connect the battery with the linear actuator and to receive one or more coded signals from a wireless transmitter for actuating the linear actuator to withdraw the actuator rod in the actuator housing and thereby pull the actuator cable, which is configured to pull the biased trip lever, to disengage the trip lever from the locking pin.

14. The self-dumping hopper of claim 13, further comprising a first pulley rotatably mounted to the trip lever, and a second pulley rotatably mounted inside the housing, wherein the actuator cable is wound about the first and second pulleys.

15. The self-dumping hopper of claim 13, wherein the linear actuator assembly further comprises a transfer box coupled between the electric motor and the linear actuator.

* * * * *